US008669669B1

(12) United States Patent
Wagoner et al.

(10) Patent No.: US 8,669,669 B1
(45) Date of Patent: Mar. 11, 2014

(54) VOLTAGE CONTROL IN A DOUBLY-FED INDUCTION GENERATOR WIND TURBINE SYSTEM

(75) Inventors: Robert Gregory Wagoner, Roanoke, VA (US); Anthony Michael Klodowski, Hardy, VA (US)

(73) Assignee: General Electric Company, Schenectady, NY (US)

( * ) Notice: Subject to any disclaimer, the term of this patent is extended or adjusted under 35 U.S.C. 154(b) by 1 day.

(21) Appl. No.: 13/613,410

(22) Filed: Sep. 13, 2012

(51) Int. Cl.
*H02P 9/00* (2006.01)

(52) U.S. Cl.
USPC ............................................. 290/44

(58) Field of Classification Search
USPC ........................................... 290/44
See application file for complete search history.

(56) References Cited

U.S. PATENT DOCUMENTS

| | | | |
|---|---|---|---|
| 6,566,764 B2 * | 5/2003 | Rebsdorf et al. | 290/44 |
| 6,856,041 B2 | 2/2005 | Siebenthaler et al. | |
| 6,924,565 B2 * | 8/2005 | Wilkins et al. | 290/44 |
| 7,391,126 B2 * | 6/2008 | Liu et al. | 290/44 |
| 7,531,910 B2 * | 5/2009 | Flottemesch et al. | 290/44 |
| 7,964,980 B2 | 6/2011 | Ichinose et al. | |
| 8,076,790 B2 | 12/2011 | Ichinose et al. | |
| RE43,698 E * | 10/2012 | Hudson | 290/44 |
| 2002/0079706 A1* | 6/2002 | Rebsdorf et al. | 290/55 |
| 2003/0151259 A1* | 8/2003 | Feddersen et al. | 290/44 |
| 2006/0192390 A1* | 8/2006 | Juanarena Saragueta et al. | 290/44 |
| 2011/0106470 A1 | 5/2011 | Yin et al. | |
| 2011/0193345 A1* | 8/2011 | Arinaga et al. | 290/44 |
| 2012/0217824 A1* | 8/2012 | Gupta et al. | 307/145 |
| 2013/0229056 A1* | 9/2013 | Teichmann | 307/18 |

FOREIGN PATENT DOCUMENTS

EP        2647839 A2 *   4/2013

* cited by examiner

*Primary Examiner* — Joseph Waks
(74) *Attorney, Agent, or Firm* — Dority & Manning, P.A.

(57) ABSTRACT

Systems and methods for regulating voltage in a doubly fed induction generator (DFIG) system are provided. More particularly, the voltage of the auxiliary power feed in a DFIG wind turbine system can be regulated by outputting reactive power from a power converter to a reactive element coupled between the auxiliary power feed and a stator bus. The reactive element can include a winding of the transformer used to couple the wind turbine system to the electrical grid and/or an inductive element coupled between the output of the power converter and the stator bus. The voltage of the auxiliary power feed can be maintained within a reduced operating range while an increased operating range can be provided for wind turbine system.

20 Claims, 4 Drawing Sheets

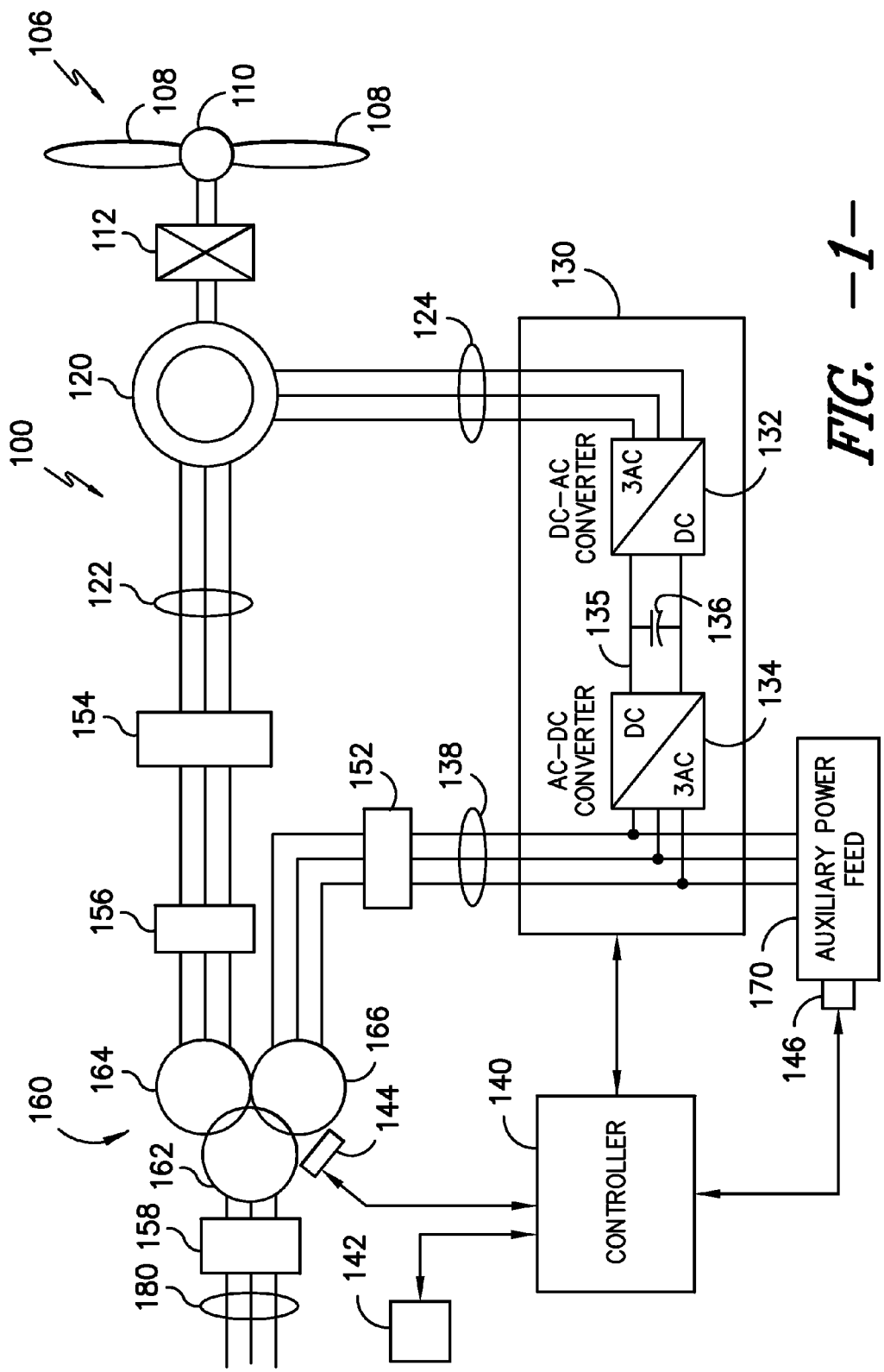
FIG. -1-

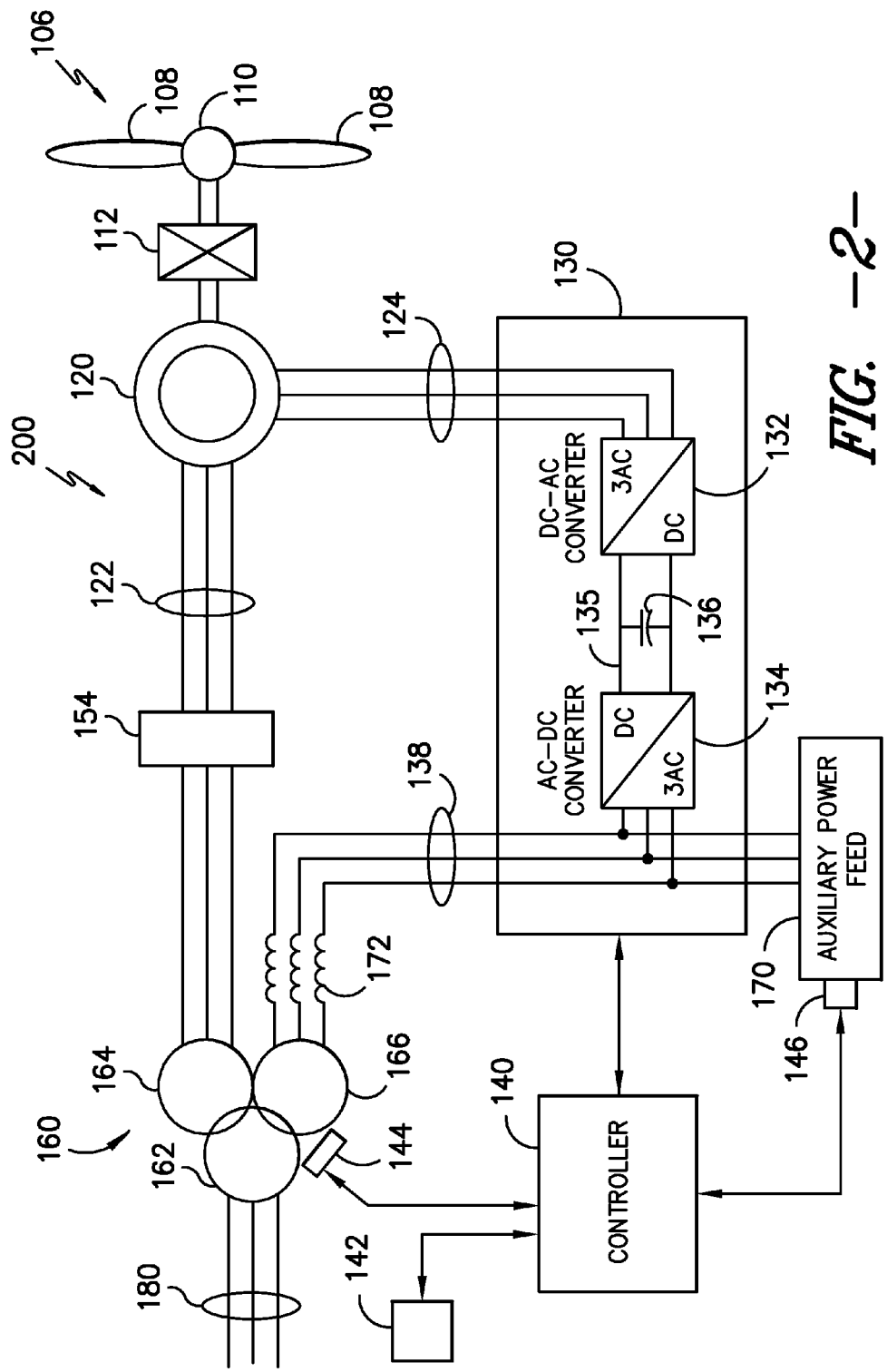
FIG. -2-

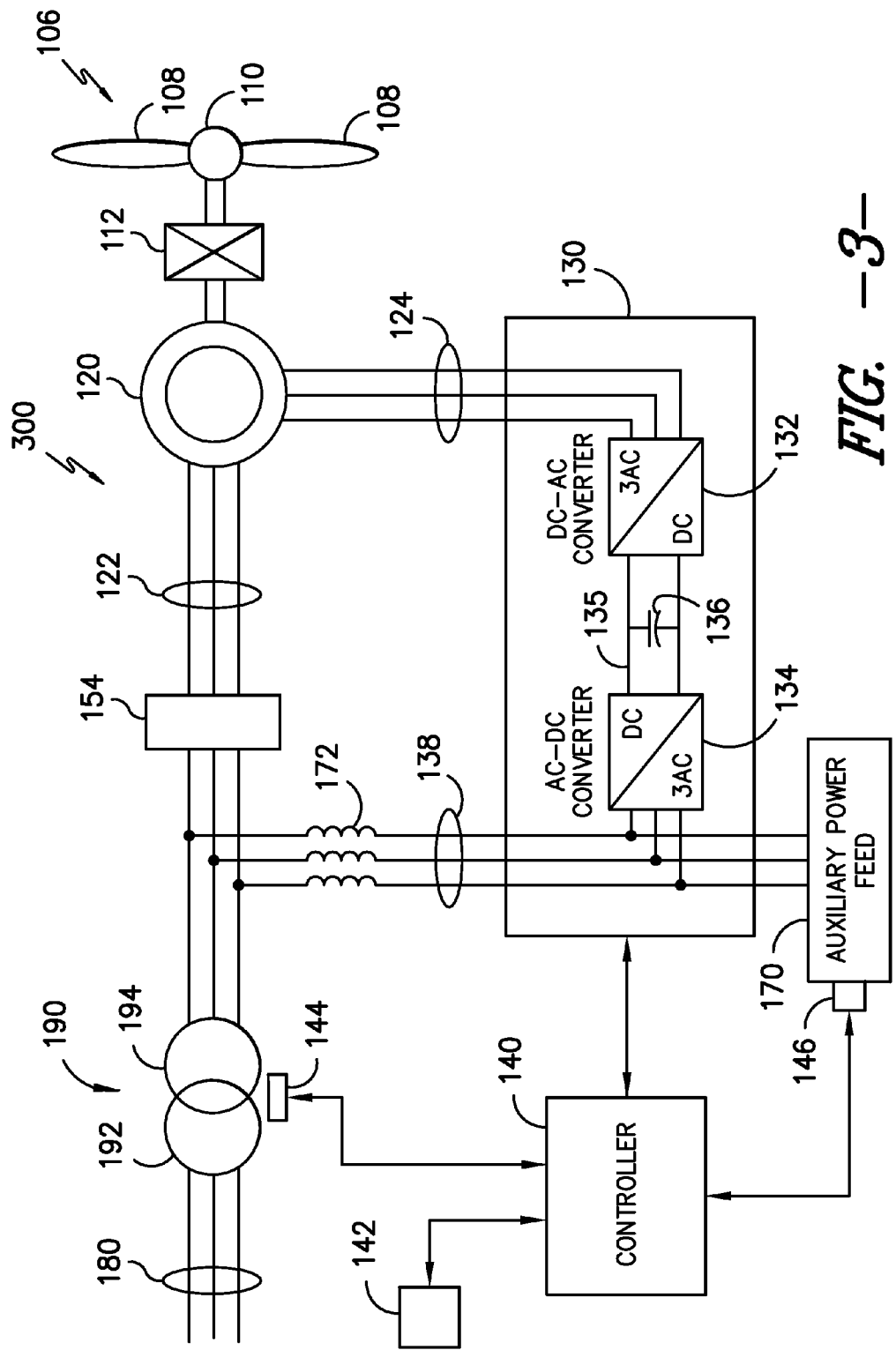
FIG. -3-

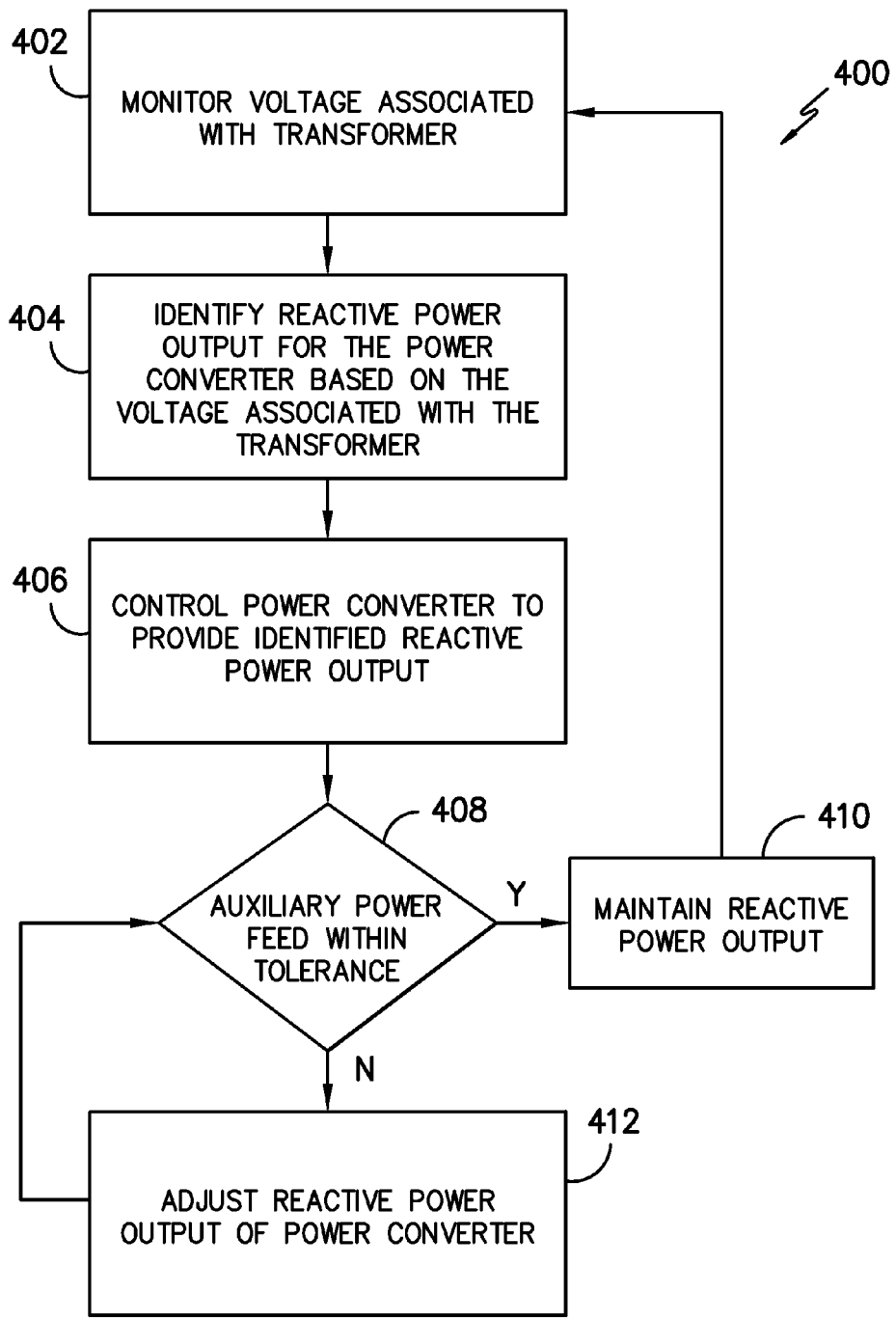
FIG. —4—

US 8,669,669 B1

VOLTAGE CONTROL IN A DOUBLY-FED INDUCTION GENERATOR WIND TURBINE SYSTEM

FIELD OF THE INVENTION

The present disclosure relates generally to renewable energy sources, and more particularly to a systems and methods of regulating voltage in a doubly fed induction generator wind turbine system.

BACKGROUND OF THE INVENTION

Wind turbines have received increased attention as a renewable energy source. Wind turbines use the wind to generate electricity. The wind turns multiple blades connected to a rotor. The spin of the blades caused by the wind spins a shaft of the rotor, which connects to a generator that generates electricity. Certain wind turbine systems include a doubly fed induction generator (DFIG) to convert wind energy into electrical power suitable for output to an electrical grid. DFIGs are typically connected to a converter that regulates the flow of electrical power between the DFIG and the grid. More particularly, the converter allows the wind turbine to output electrical power at the grid frequency regardless of the rotational speed of the wind turbine blades.

A typical DFIG system includes a wind driven DFIG having a rotor and a stator. The stator of the DFIG is coupled to the electrical grid through a stator bus. A power converter is used to couple the rotor of the DFIG to the electrical grid. The power converter can be a two-stage power converter including both a rotor side converter and a line side converter. The rotor side converter can receive alternating current (AC) power from the rotor via a rotor bus and can convert the AC power to a DC power. The line side converter can then convert the DC power to AC power having a suitable output frequency, such as the grid frequency. The AC power is provided to the electrical grid via a line bus. An auxiliary power feed can be coupled to the line bus to provide power for components used in the wind turbine system, such as fans, pumps, motors, and other components of the wind turbine system.

A typical DFIG system includes a two-winding transformer having a high voltage primary (e.g. greater than 12 KVAC) and a low voltage secondary (e.g. 575VAC, 690VAC, etc.) to couple the DFIG system to the electrical grid. The high voltage primary can be coupled to the high voltage electrical grid. The stator bus providing AC power from the stator of the DFIG and the line bus providing AC power from the power converter can be coupled to the low voltage secondary. In this system, the output power of the stator and the output power of the power converter are operated at the same voltage and combined into the single transformer secondary winding at the low voltage.

More recently, DFIG systems have included a three winding transformer to couple the DFIG system to the electrical grid. The three winding transformer can have a high voltage (e.g. greater than 12 KVAC) primary winding coupled to the electrical grid, a medium voltage (e.g. 6 KVAC) secondary winding coupled to the stator bus, and a low voltage (e.g. 575VAC, 690VAC, etc.) auxiliary winding coupled to the line bus. The three winding transformer arrangement can be preferred in increased output power systems (e.g. 3 MW systems) as it reduces the current in the stator bus and other components on the stator side of the DFIG, such as a stator synch switch.

Typically, the output voltage of the DFIG system on the primary winding of the transformer (e.g. a two winding transformer or a three winding transformer) can have a maximum continuous operating range of nominal voltage ±10%. Standard components of a wind turbine system which are powered by the auxiliary feed coupled to the line bus are typically designed to accommodate this range of nominal voltage ±10%. However, the operating range of new DFIG wind turbine systems has increased to accommodate a wider operating range on the primary of the transformer, such as nominal voltage ±15%.

A wider operating range on the primary winding of the transformer causes the voltage on the auxiliary power feed used to power components of the wind turbine system to have the possibility of being higher or lower than the ratings of the standard components powered by the auxiliary power feed. As a result, special components (e.g. components with higher ratings) may be required to accommodate the wider operating range. These special components can cost significantly more than standard components, and may require special qualification testing. In certain cases, special components that can accommodate a wider operating range may not be available at all, in which case major redesign of sections of the wind turbine system may be necessary. Consequently, providing a wider operating range on the primary of the transformer of the DFIG system (e.g. nominal voltage ±15%) can lead to significant drawbacks, including higher auxiliary system cost, longer development schedules, and other drawbacks.

Thus, a need exists for a system and method for improved voltage control in a DFIG wind turbine system. A system and method that can accommodate a wider operating range (e.g. nominal voltage ±15%) on the primary winding of the transformer while maintaining a standard operating range (e.g. nominal voltage ±10%) for the auxiliary power feed would be particularly useful.

BRIEF DESCRIPTION OF THE INVENTION

Aspects and advantages of the invention will be set forth in part in the following description, or may be obvious from the description, or may be learned through practice of the invention.

One exemplary aspect of the present disclosure is directed to a wind turbine system. The wind turbine system includes a wind driven doubly fed induction generator having a rotor and a stator. The stator provides AC power to a stator bus. The wind turbine system further includes a power converter coupled to the rotor of the doubly fed induction generator. The power converter provides an output to a line bus. The wind turbine system further includes a transformer coupled to the stator bus, an auxiliary power feed coupled to the at least one power converter, and at least one reactive element coupled between the auxiliary power feed and the stator bus. The at least one reactive element can be a winding of the transformer or a separate reactive element, such as an inductive element coupled between the auxiliary power feed and the stator bus. The system further includes a control system configured to control the power converter. The control system is configured to regulate the auxiliary power feed by outputting reactive power from the power converter to the at least one reactive element.

Another exemplary aspect of the present disclosure is directed to a method for regulating an auxiliary power feed of a wind turbine system. The method includes monitoring a voltage associated with a transformer coupling the wind turbine system to an electrical grid and identifying a reactive power output for a power converter based on the voltage associated with the transformer. The reactive power output is identified to regulate the voltage of the auxiliary power feed.

The method further includes controlling the power converter to provide the identified reactive power output to a line bus coupled to the power converter.

Yet another exemplary aspect of the present disclosure is directed to a control system for controlling a power converter of a wind turbine system. The control system includes a sensor configured to provide a signal indicative of a voltage associated with a transformer coupling the wind turbine system to an electrical grid. The control system further includes a controller configured to control the power converter based on the signal indicative of the voltage associated with the transformer to regulate the voltage of the auxiliary power feed. The controller is configured to regulate the voltage of the auxiliary power feed by controlling the power converter to provide reactive power to a reactive element coupled between the output of the power converter and a stator bus.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 depicts an exemplary DFIG wind turbine system according to an exemplary embodiment of the present disclosure;

FIG. 2 depicts an exemplary DFIG wind turbine system according to an exemplary embodiment of the present disclosure;

FIG. 3 depicts an exemplary DFIG wind turbine system according to an exemplary embodiment of the present disclosure; and FIG. 4 depicts an exemplary method for regulating an auxiliary power feed of a DFIG wind turbine system according to an exemplary embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods for regulating voltage in a doubly fed induction generator (DFIG) system. The DFIG system can include a wind driven doubly fed induction generator having a rotor and a stator. The stator can provide AC power to a stator bus. The rotor can provide AC power to a power converter. The power can provide an output to a line bus. The stator bus and the line bus can be coupled to an electrical grid through a transformer, such as a two-winding transformer or a three-winding transformer. An auxiliary power feed can be coupled to the output of the power converter. The auxiliary power feed can provide power for various components of the wind turbine system, such as fans, pumps, motors, and other components of the wind turbine system.

According to aspects of the present disclosure, the voltage of the auxiliary power feed can be regulated by outputting reactive power from the power converter to a reactive element coupled between the auxiliary power feed and the stator bus. The reactive element can include a winding of the transformer used to couple the wind turbine system to the electrical grid and/or an inductive element coupled between the output of the power converter and the stator bus. Outputting reactive power to at least one reactive element can cause a voltage reduction between the transformer and the auxiliary power feed.

As a result, the voltage of the auxiliary power feed can be maintained within a reduced operating range while an increased operating range can be provided for the voltage of a primary winding of the transformer coupled to an electrical grid. For instance, the operating range of the auxiliary power feed can be maintained to be nominal voltage ±10% while the operating range of the primary winding of the transformer can be nominal voltage ±15%. In this manner, the operating range of the wind turbine system can be increased without having to redesign or accommodate special components in the auxiliary power system of the wind turbine system.

FIG. 1 depicts an exemplary doubly-fed induction generator (DFIG) wind turbine system 100 according to an exemplary embodiment of the present disclosure. In the exemplary system 100, a rotor 106 includes a plurality of rotor blades 108 coupled to a rotating hub 110, and together define a propeller. The propeller is coupled to an optional gear box 112, which is, in turn, coupled to a generator 120. In accordance with aspects of the present disclosure, the generator 120 is a doubly fed induction generator (DFIG) 120.

DFIG 120 is typically coupled to a stator bus 122 and a power converter 130 via a rotor bus 124. The stator bus 122 provides an output multiphase power (e.g. three-phase power) from a stator of DFIG 120 and the rotor bus 124 provides an output multiphase power (e.g. three-phase power) of the rotor of DFIG 120. Referring to the power converter 130, DFIG 120 is coupled via the rotor bus 124 to a rotor side converter 132. The rotor side converter 132 is coupled to a line side converter 134 which in turn is coupled to a line side bus 138.

In exemplary configurations, the rotor side converter 132 and the line side converter 134 are configured for normal operating mode in a three-phase, pulse width modulation (PWM) arrangement using insulated gate bipolar transistors (IGBTs) as switching devices. Other suitable switching devices can be used, such as insulated gate commuted thyristors, MOSFETs, bipolar transistors, silicon controlled rectifiers, or other suitable switching devices. The rotor side converter 132 and the line side converter 134 can be coupled via a DC link 135 across which is the DC link capacitor 136.

The power converter 130 can be coupled to a controller 140 to control the operation of the rotor side converter 132 and the line side converter 134. For instance, the controller 140 can send control commands to the rotor side converter 132 and line side converter 134 to control the modulation of switching elements (such as IGBTs) used in the power converter 130 to provide a desired real and reactive power output. The controller 140 can be any suitable control circuit. For instance, in one aspect the controller can include summers, compensating regulators, and other devices used to process signals received at the controller 140. In another embodiment, the controller 140 can include a processing device (e.g. microprocessor, microcontroller, etc.) executing computer-readable instructions stored in a computer-readable medium. The instructions when executed by the processing device can cause the processing device to perform control operations, such as regulating voltage of the DFIG wind turbine system 100 according to any exemplary aspects of the present disclosure.

As illustrated, the system 100 includes a transformer 160 coupling the wind turbine system 100 to an electrical grid 180. The transformer 160 of FIG. 1 is a three-winding transformer that includes a high voltage (e.g. greater than 12 KVAC) primary winding 162 coupled to the electrical grid, a medium voltage (e.g. 6 KVAC) secondary winding 164 coupled to the stator bus 122, and a low voltage (e.g. 575 VAC, 690 VAC, etc.) auxiliary winding 166 coupled to the line bus 138.

An auxiliary power feed 170 is coupled to the output of the power converter 130. The auxiliary power feed 170 acts as a power source for various components of the wind turbine system 100. For instance, the auxiliary power feed 170 can power fans, pumps, motors, and other suitable components of the wind turbine system 100.

In operation, power generated at DFIG 120 by rotating the rotor 106 is provided via a dual path to electrical grid 180. The dual paths are defined by the stator bus 122 and the rotor bus 124. On the rotor bus side 124, sinusoidal multi-phase (e.g. three-phase) alternating current (AC) power is provided to the power converter 130. The rotor side power converter 132 converts the AC power provided from the rotor bus 124 into direct current (DC) power and provides the DC power to the DC link 135. Switching devices (e.g. IGBTs) used in parallel bridge circuits of the rotor side power converter 132 can be modulated to convert the AC power provided from the rotor bus 124 into DC power suitable for the DC link 135.

The line side converter 134 converts the DC power on the DC link 135 into AC power at a frequency suitable for the electrical grid 180. In particular, switching devices (e.g. IGBTs) used in bridge circuits of the line side power converter 134 can be modulated to convert the DC power on the DC link 135 into AC power on the line side bus 138. The power from the power converter 130 can be provided via the auxiliary winding 166 of the transformer 160 to the electrical grid 180.

Various circuit breakers, fuses, switches, contactors, and other devices, such as grid breaker 158, stator bus breaker 156, stator sync switch 154, and line bus breaker 152, can be included in the system 100 to connect or disconnect corresponding buses, for example, when current flow is excessive and can damage components of the wind turbine system 100 or for other operational considerations. Additional protection components can also be included in the wind turbine system 100.

The power converter 130 can receive control signals from, for instance, the control system 142 via the controller 140. The control signals can be based, among other things, on sensed conditions or operating characteristics of the wind turbine system 100. For instance, the control signals can be based on sensed voltage associated with the transformer 160 as determined by a voltage sensor 144. As another example, the control signals can be based on sensed voltage associated with the auxiliary power feed 170 as determined by a voltage sensor 146.

Typically, the control signals provide for control of the operation of the power converter 130. For example, feedback in the form of sensed speed of the DFIG. 120 can be used to control the conversion of the output power from the rotor bus 156 to maintain a proper and balanced multi-phase (e.g. three-phase) power supply. Other feedback from other sensors can also be used by the control system 174 to control the power converter 162, including, for example, stator and rotor bus voltages and current feedbacks. Using the various forms of feedback information, switching control signals (e.g. gate timing commands for IGBTs), stator synchronizing control signals, and circuit breaker signals can be generated.

According to aspects of the present disclosure, the voltage of the auxiliary power feed 170 can be regulated by the controller 140. In particular, the controller 140 can control the power converter 130 to output excess reactive power to a reactive element coupled between the power converter 130 and the stator bus 122 to regulate the voltage of the auxiliary power feed 170. Outputting the reactive power to the reactive element will influence the voltage of the line bus 138 and correspondingly the voltage at the auxiliary power feed 170. As a result, the auxiliary power feed 170 can be regulated to operate within a narrower operating range when compared to the operating range of the wind turbine system 100.

In the embodiment shown in FIG. 1, the controller 140 can monitor a voltage associated with the transformer 160 using voltage sensor 144. The voltage associated with the transformer 160 can be the voltage of the primary winding 162 or the voltage of a secondary winding, such as the voltage of secondary winding 164 or auxiliary winding 166. Based on the voltage associated with the transformer 160, the controller 140 can identify a reactive power output for the power converter 130 to maintain the voltage of the auxiliary power feed 130 to be within a predefined tolerance of nominal voltage for the auxiliary power feed 170, such as within 10% of the nominal voltage of the auxiliary power feed 170. The controller 140 can then send control commands to the power converter 130, such as gate timing commands for IGBTs used in the line side converter 134 and/or the rotor side converter 132, to control the power converter 130 to output the identified reactive power from the power converter 130 to a reactive element coupled between the auxiliary power feed 170 and the stator bus 122.

In the embodiment shown in FIG. 1, the reactive element is the auxiliary winding 166 of the transformer 160. More particularly, the impedance of the auxiliary winding 166 of the transformer 160 can be sufficient to allow regulation of the auxiliary power feed 130 by outputting reactive power to the auxiliary winding 166 of the transformer. The excess reactive power supplied to the auxiliary winding 166 will influence the voltage of the auxiliary power feed 170 such that the operating range of the auxiliary power feed 170 can be maintained within a predetermined tolerance of nominal voltage. For instance, the auxiliary power feed 170 can be maintained within an operating range of nominal voltage ±10%, while the voltage on the primary winding 162 of the transformer 160 can be maintained within an operating range of nominal voltage ±15%.

In a particular implementation, the controller 140 can be configured to monitor the voltage of the auxiliary power feed 170 to determine whether the auxiliary winding remains within the predetermined tolerance of nominal voltage. For instance, the controller 140 can monitor the voltage associated with the auxiliary power feed 170 using voltage sensor 146. If the voltage exceeds or falls below a certain threshold, such as within 10% of nominal voltage for the auxiliary power feed, the controller 140 can control the power converter 130 to adjust the reactive power output of the power converter 130 until the voltage of the auxiliary power feed 170 is maintained within the predetermined tolerance.

In this manner, the controller 140 can regulate the voltage of the auxiliary power feed 170 to be within a predefined operating range while allowing the wind turbine system 100 to have an increased operating range output. As a result, standard components can be used in the auxiliary power system of the wind turbine system 100, leading to lower cost, shorter design/development/test schedule, and reduced engineering effort.

FIG. 2 depicts a DFIG wind turbine system 200 according to another exemplary embodiment of the present disclosure. The DFIG wind turbine system 200 is substantially similar to the wind turbine system 100 of FIG. 1, except that the DFIG wind turbine system 200 of FIG. 2 includes an additional reactive element, namely an inductive element 172, coupled between the output of the power converter 130 and the auxiliary winding 166. Certain circuit breakers, switches, contacts, and other devices are not illustrated in FIG. 2 for purposes of clarity of illustration.

Similar to the system 100 depicted in FIG. 1, the controller 140 can regulate the voltage of the auxiliary power feed 170 by controlling the power converter 130 to output reactive power to a reactive element coupled between the auxiliary power feed 170 and the stator bus 122. In the embodiment of FIG. 2, the reactive element includes the auxiliary winding 166 of the transformer 160 as well as the additional inductive element 172 coupled between the auxiliary power feed 170 and the auxiliary winding 166. The inductive element 172 can be external to or a part of the power converter 130.

The inductive element 172 can provide any additional impedance necessary for regulating the auxiliary power feed 170 by outputting reactive power from the power converter 130. For instance, if the impedance of the auxiliary winding 166 of the transformer 160 is not sufficient to allow for regulation of the auxiliary power feed 170 by outputting reactive power from the power converter 130, the additional inductive element 172 can be included between the auxiliary power feed 170 and the auxiliary winding 166 of the transformer to provide the required additional impedance.

FIG. 3 depicts a DFIG wind turbine system 300 according to yet another exemplary embodiment of the present disclosure. The DFIG wind turbine system 300 of FIG. 3 is similar to the DFIG wind turbine system 100 of FIG. 1, except that the DFIG wind turbine system 300 includes a two-winding transformer 190 coupling the wind turbine system 300 to an electrical grid 180. The two-winding transformer 190 includes a primary winding 192 coupled to the electrical grid 180 and a secondary winding 194 coupled to the stator bus 122 and to the line bus 138.

Similar to the system 100 depicted in FIG. 1, the controller 140 can regulate the voltage of the auxiliary power feed 170 by controlling the power converter 130 to output reactive power to a reactive element coupled between the auxiliary power feed 170 and the stator bus 122. In the system 300 of FIG. 3, the reactive element includes an inductive element 172 coupled between the auxiliary power feed 170 and stator bus 122. The inductive element 172 can be external to or a part of the power converter 130. The inductive element 172 can provide the required impedance necessary for regulating the auxiliary power feed 170 by outputting reactive power from the power converter 130.

FIG. 4 depicts a flow diagram of an exemplary method (400) for regulating the auxiliary power feed of a DFIG wind turbine system. The method (400) will be discussed with reference to the exemplary DFIG wind turbine system 100 of FIG. 1. However, the method (400) can be implemented using any suitable system. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

At (402), the method includes monitoring a voltage associated with a transformer coupling the DFIG system to the utility grid. For instance, the method can include monitoring, with voltage sensor 144, the voltage of transformer 160. The voltage associated with the transformer 160 can be a voltage associated with the primary winding 162, secondary winding 164, and/or auxiliary winding 166 of the transformer 160. The sensor 144 can provide a signal indicative of the voltage associated with the transformer to the controller 140.

At (404), the method includes identifying a reactive power output for the power converter based on the voltage associated with the transformer. For instance, the controller 140 can process the signal indicative of the voltage associated with the transformer received from the sensor 144 to identify a necessary reactive power output for the power converter 130 to maintain the voltage of the auxiliary power feed 170 within a predefined threshold of nominal voltage, such as within ±10% of nominal voltage of the auxiliary power feed 170. The reactive power output can be identified using any suitable process or technique, such as by accessing a model defining the relationships between one or more components of the DFIG system.

Once the reactive power output has been identified, a power converter can be controlled to output the identified reactive power to at least one reactive element to regulate the voltage of the auxiliary power feed (406). For instance, the controller 140 can send control commands to the power converter 130 to control the power converter 130 to output the identified reactive power to the reactive element. In one aspect, the control commands can control the modulation of switching devices (IGBTs) used in the power converter 130 such that the power converter 130 provides the identified reactive power to the reactive element.

To ensure that the auxiliary power feed of the DFIG system remains within a predetermined tolerance (e.g. within 10% of nominal voltage), the method can further include monitoring the voltage of the auxiliary power feed to determine if the auxiliary power is maintained within the predetermine tolerance (408). For instance, the voltage sensor 146 can monitor the voltage of the auxiliary power feed 170 and provide a signal indicative of the voltage to the controller 140. The controller 140 can determine whether the voltage is within the predetermined tolerance based on the signal received from the voltage sensor 146.

If the voltage of the auxiliary power feed is within the predetermined tolerance, the method can include maintaining the reactive power output of the power converter (410). For instance, the controller 140 can send control commands to the power converter 130 to maintain the reactive power output of the power converter 130. Otherwise, the method can adjust the reactive power output of the power converter until the voltage of the auxiliary power feed is within the predetermined tolerance (412). For instance the controller 140 can send control commands to the power converter to adjust the reactive power output of the power converter 130 until the voltage of the auxiliary power feed 170 is within the predetermined tolerance. The method can then return to (402) where the voltage of the auxiliary power feed continues to be regulated by monitoring the voltage associated with the transformer and outputting a reactive power from the power converter identified based on the voltage associated with the transformer.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wind turbine system, comprising:
a wind driven doubly fed induction generator having a rotor and a stator, the stator providing AC power to a stator bus;
a power converter coupled to the rotor of said doubly fed induction generator, said power converter providing an output to a line bus;
a transformer coupled to the stator bus;
an auxiliary power feed coupled to the at least one power converter;
at least one reactive element coupled between the auxiliary power feed and the stator bus; and
a control system configured to control said power converter, said control system configured to regulate the voltage of said auxiliary power feed by outputting reactive power from the power converter to the at least one reactive element.

2. The wind turbine system of claim 1, wherein the transformer comprises a primary winding coupled to an electrical grid and a secondary winding coupled to the stator bus.

3. The wind turbine system of claim 2, wherein the at least one reactive element comprises an inductive element coupled between the output of the power converter and the stator bus.

4. The wind turbine system of claim 1, wherein the transformer comprises a primary winding coupled to an electrical grid, a secondary winding coupled to the stator bus, and an auxiliary winding coupled to the line bus.

5. The wind turbine system of claim 4, wherein the at least one reactive element comprises the auxiliary winding.

6. The wind turbine system of claim 5, wherein the at least one reactive element further comprises an inductive element coupled between the output of said power converter and the auxiliary winding.

7. The wind turbine system of claim 1, wherein the system further comprises one or more fuses, circuit breakers, or contactors coupled between the output of the power converter and the transformer.

8. The wind turbine system of claim 1, wherein said control system is configured to adjust an output reactive power of said power converter based on a voltage associated with the transformer to regulate the voltage of said auxiliary power feed.

9. The wind turbine system of claim 8, wherein the voltage associated with said transformer is a voltage associated with a primary winding of the transformer, the primary winding coupled to an electrical grid.

10. The wind turbine system of claim 8, wherein the voltage associated with said transformer comprises is a voltage associated with a secondary winding of the transformer, the secondary winding coupled to the stator bus.

11. The wind turbine system of claim 8, wherein said control system is configured to adjust the output reactive power of said power converter to maintain the voltage of the auxiliary power feed to be within about ±10% of the nominal voltage of the auxiliary power feed.

12. A method for regulating an auxiliary power feed of a wind turbine system, the wind turbine system comprising a wind driven doubly fed induction generator having a rotor and a stator, the stator providing AC power to a stator bus, the wind turbine system further comprising a power converter coupled to the rotor of the doubly fed induction generator, the power converter providing an output to a line bus, the auxiliary power feed coupled to the output of the power converter, the method comprising:
monitoring a voltage associated with a transformer coupling the wind turbine system to an electrical grid;
identifying a reactive power output for the power converter based on the voltage associated with the transformer, the reactive power output identified to regulate the voltage of the auxiliary power feed; and
controlling the power converter to provide the identified reactive power output to the line bus.

13. The method of claim 12, wherein the identified reactive power output is provided to at least one reactive element coupled between the auxiliary power source and the stator bus.

14. The method of claim 12, wherein the reactive power output is identified to maintain the voltage of the auxiliary power feed to be within about ±10% of the nominal voltage of the auxiliary power feed.

15. The method of claim 12, wherein the voltage associated with said transformer is a voltage associated with a primary winding of the transformer, the primary winding coupled to an electrical grid.

16. The method of claim 12, wherein the voltage associated with said transformer comprises a voltage associated with a secondary winding of the transformer, the secondary winding coupled to the stator bus.

17. A control system for controlling a power converter of a wind turbine system, the wind turbine system comprising a wind driven doubly fed induction generator having a rotor and a stator, the stator providing AC power to a stator bus, the power converter coupled to the rotor of the doubly fed induction generator, the power converter providing an output to a line bus, the wind turbine system further comprising an auxiliary power feed coupled to output of the power converter, the control system comprising:
a sensor configured to provide a signal indicative of a voltage associated with a transformer coupling the wind turbine system to an electrical grid; and
a controller configured to control the power converter based on the signal indicative of the voltage associated with the transformer to regulate the voltage of the auxiliary power feed;
wherein said controller is configured to regulate the voltage of the auxiliary power feed by controlling the power converter to provide reactive power to a reactive element coupled between the output of the power converter and the stator bus.

18. The control system of claim 17, wherein the voltage associated with the transformer is a voltage associated with a primary winding of the transformer, the primary winding coupled to an electrical grid.

19. The control system of claim 17, wherein the voltage associated with the transformer comprises is a voltage associated with a secondary winding of the transformer, the secondary winding coupled to the stator bus.

20. The control system of claim 17, wherein the controller is configured to control the power converter to adjust the reactive power provided to the reactive element to maintain the voltage of the auxiliary power feed to be within about ±10% of the nominal voltage of the auxiliary power feed.

* * * * *